United States Patent
Peng et al.

(10) Patent No.: US 11,689,822 B2
(45) Date of Patent: Jun. 27, 2023

(54) DUAL SENSOR IMAGING SYSTEM AND PRIVACY PROTECTION IMAGING METHOD THEREOF

(71) Applicant: Altek Semiconductor Corp., Hsinchu (TW)

(72) Inventors: Shih-Yuan Peng, Hsinchu (TW); Shu-Chun Cheng, Hsinchu (TW); Hsu-Lien Huang, Taipei (TW); Yun-Chin Li, Hsinchu (TW); Kuo-Ming Lai, Hsinchu (TW)

(73) Assignee: Altek Semiconductor Corp., Hsinchu (TW)

( * ) Notice: Subject to any disclaimer, the term of this patent is extended or adjusted under 35 U.S.C. 154(b) by 130 days.

(21) Appl. No.: 17/214,937

(22) Filed: Mar. 29, 2021

(65) Prior Publication Data

US 2021/0218871 A1    Jul. 15, 2021

Related U.S. Application Data

(60) Provisional application No. 63/074,477, filed on Sep. 4, 2020.

(30) Foreign Application Priority Data

Dec. 30, 2020   (TW) ................................. 109146831

(51) Int. Cl.
*H04N 5/225* (2006.01)
*H04N 9/04* (2006.01)
(Continued)

(52) U.S. Cl.
CPC ....... *H04N 9/04559* (2018.08); *G06F 18/211* (2023.01); *G06F 21/6245* (2013.01);
(Continued)

(58) Field of Classification Search
None
See application file for complete search history.

(56) References Cited

U.S. PATENT DOCUMENTS

| 2008/0024608 A1 | 1/2008 | Hahn et al. |
| 2008/0144944 A1* | 6/2008 | Breed ................... G06V 40/103 |
| | | 382/224 |

(Continued)

FOREIGN PATENT DOCUMENTS

| CN | 102461156 | 5/2012 |
| CN | 107431760 | 12/2017 |

(Continued)

OTHER PUBLICATIONS

"Office Action of Taiwan Related Application, application No. 109146922", dated Oct. 28, 2021, p. 1-p. 14.
(Continued)

*Primary Examiner* — Mohammad J Rahman
(74) *Attorney, Agent, or Firm* — JCIPRNET (57) ABSTRACT

A dual sensor imaging system and a privacy protection imaging method thereof are provided. The system is configured to control at least one color sensor and at least one IR sensor to respectively capture multiple color images and multiple IR images by adopting multiple exposure conditions adapted for an imaging scene, adaptively select a combination of the color image and the IR image that can reveal details of the imaging scene, detect a feature area with features of a target of interest in the color image, and fuse the color image and the IR image to generate a fusion image with the details of the imaging scene, and crop an image of the feature area of the fusion image to be replaced with an image not belonging to the IR image, so as to generate a scene image.

18 Claims, 7 Drawing Sheets

(51) Int. Cl.

| | | |
|---|---|---|
| *H04N 5/77* | (2006.01) | |
| *H04N 5/265* | (2006.01) | |
| *H04N 5/235* | (2006.01) | |
| *H04N 5/262* | (2006.01) | |
| *G06T 7/00* | (2017.01) | |
| *G06T 5/50* | (2006.01) | |
| *G06T 5/00* | (2006.01) | |
| *G06K 9/62* | (2022.01) | |
| *G06F 21/84* | (2013.01) | |
| *G06F 21/62* | (2013.01) | |
| *G06F 18/211* | (2023.01) | |
| *H04N 23/45* | (2023.01) | |
| *H04N 23/10* | (2023.01) | |
| *H04N 23/73* | (2023.01) | |
| *H04N 23/741* | (2023.01) | |
| *G06V 40/16* | (2022.01) | |

(52) U.S. Cl.
CPC ............. *G06F 21/84* (2013.01); *G06T 5/005* (2013.01); *G06T 5/50* (2013.01); *G06T 7/0002* (2013.01); *G06V 40/16* (2022.01); *H04N 5/265* (2013.01); *H04N 5/2628* (2013.01); *H04N 5/772* (2013.01); *H04N 23/10* (2023.01); *H04N 23/45* (2023.01); *H04N 23/73* (2023.01); *H04N 23/741* (2023.01); *G06T 2207/10024* (2013.01); *G06T 2207/10048* (2013.01); *G06T 2207/20081* (2013.01); *G06T 2207/20132* (2013.01); *G06T 2207/20208* (2013.01); *G06T 2207/20221* (2013.01); *G06T 2207/30168* (2013.01)

(56) References Cited

U.S. PATENT DOCUMENTS

| | | | |
|---|---|---|---|
| 2011/0228096 A1* | 9/2011 | Friel | H04N 5/33 |
| | | | 348/E5.09 |
| 2011/0292216 A1* | 12/2011 | Fergus | G06T 5/00 |
| | | | 348/E5.09 |
| 2011/0298898 A1 | 12/2011 | Jung et al. | |
| 2012/0189293 A1 | 7/2012 | Cao et al. | |
| 2013/0342703 A1 | 12/2013 | Lin | |
| 2014/0132804 A1* | 5/2014 | Guissin | G08B 13/19602 |
| | | | 348/239 |
| 2014/0354853 A1* | 12/2014 | Venkataraman | H04N 5/2253 |
| | | | 348/239 |
| 2014/0354855 A1* | 12/2014 | Venkataraman | H04N 5/228 |
| | | | 348/239 |
| 2015/0049063 A1* | 2/2015 | Smith | G06F 3/0421 |
| | | | 345/175 |
| 2015/0109454 A1* | 4/2015 | Strandemar | H04N 5/332 |
| | | | 348/164 |
| 2015/0245062 A1 | 8/2015 | Shimizu et al. | |
| 2015/0334283 A1 | 11/2015 | Vranceanu | |
| 2017/0024877 A1* | 1/2017 | Versace | G06V 20/10 |
| 2017/0094141 A1 | 3/2017 | Hicks | |
| 2017/0140253 A1* | 5/2017 | Wshah | G06N 3/08 |
| 2017/0236260 A1 | 8/2017 | Budagavi et al. | |
| 2017/0318222 A1 | 11/2017 | Mantzel et al. | |
| 2017/0330053 A1 | 11/2017 | Park et al. | |
| 2018/0139431 A1 | 5/2018 | Simek et al. | |
| 2018/0259339 A1* | 9/2018 | Johnson | G06T 3/60 |
| 2018/0278832 A1 | 9/2018 | Shabtay et al. | |
| 2019/0197667 A1 | 6/2019 | Paluri | |
| 2019/0251356 A1* | 8/2019 | Rivers | G06T 3/60 |
| 2019/0378257 A1* | 12/2019 | Fan | H04N 9/04555 |
| 2019/0378258 A1* | 12/2019 | Fan | H04N 5/33 |
| 2020/0005455 A1* | 1/2020 | Alshurafa | A61B 5/7267 |
| 2020/0045247 A1 | 2/2020 | Okamoto et al. | |
| 2020/0057488 A1* | 2/2020 | Johnson | G06T 15/205 |
| 2020/0126246 A1 | 4/2020 | Mantzel et al. | |
| 2020/0134849 A1 | 4/2020 | Blasco Claret et al. | |
| 2020/0166646 A1 | 5/2020 | Van Der Sijde et al. | |
| 2020/0193584 A1 | 6/2020 | Park et al. | |
| 2020/0294214 A1 | 9/2020 | Numata | |
| 2020/0342275 A1* | 10/2020 | Weng | G06T 3/40 |
| 2020/0359890 A1* | 11/2020 | Zhang | G16H 50/20 |
| 2021/0044763 A1* | 2/2021 | Sun | H04N 5/2353 |
| 2021/0201476 A1 | 7/2021 | Prasad et al. | |
| 2022/0046194 A1* | 2/2022 | Zhang | H04N 5/33 |
| 2022/0070432 A1* | 3/2022 | Zhang | H04N 5/2354 |
| 2022/0283442 A1* | 9/2022 | Lee | H04N 5/2258 |

FOREIGN PATENT DOCUMENTS

| | | |
|---|---|---|
| CN | 107846537 | 3/2018 |
| CN | 110462686 | 11/2019 |
| CN | 110490811 | 11/2019 |
| CN | 110706178 | 1/2020 |
| CN | 111050143 | 4/2020 |
| CN | 111527743 | 8/2020 |
| CN | 111540003 | 8/2020 |
| TW | M458748 | 8/2013 |
| TW | 201712580 | 4/2017 |
| TW | 201721269 | 6/2017 |
| TW | 201931847 | 8/2019 |
| WO | 2020055619 | 3/2020 |

OTHER PUBLICATIONS

"Office Action of Taiwan Related Application, application No. 109145632", dated Nov. 10, 2021, p. 1-p. 8.

"Office Action of Taiwan Counterpart Application", dated Nov. 30, 2021, p. 1-p. 21.

"Office Action of Taiwan Related Application, application No. 109146764", dated Dec. 28, 2021, p. 1-p. 8.

"Office Action of Taiwan Counterpart Application", dated Nov. 11, 2022, pp. 1-6.

"Office Action of Taiwan Related Application, Application No. 109145614", dated Mar. 3, 2022, p. 1-p. 17.

"Office Action of U.S. Related Application, U.S. Appl. No. 17/214,946", dated Apr. 13, 2022, p. 1-p. 36.

"Office Action of U.S. Related Application, U.S. Appl. No. 17/191,701", dated Apr. 28, 2022, p. 1-p. 21.

* cited by examiner

DUAL SENSOR IMAGING SYSTEM AND PRIVACY PROTECTION IMAGING METHOD THEREOF

CROSS-REFERENCE TO RELATED APPLICATION

This application claims the priority benefit of U.S. Provisional Application No. 63/074,477, filed on Sep. 4, 2020 and Taiwan application serial no. 109146831, filed on Dec. 30, 2020. The entirety of each of the above-mentioned patent applications is hereby incorporated by reference herein and made a part of this specification.

BACKGROUND

Technical Field

The disclosure relates to an imaging system and an imaging method, and in particular to a dual sensor imaging system and a privacy protection imaging method thereof.

Description of Related Art

The exposure conditions of a camera (including aperture, shutter, and photosensitivity) may affect the quality of a captured image. Therefore, many cameras automatically adjust the exposure conditions during the image capturing process to obtain clear and bright images. However, in high-contrast scenes such as low light sources or backlights, the result of adjusting the exposure conditions of the camera may result in excessive noise or overexposure in some areas, such that the image quality of all areas cannot be taken care of.

Figure 1:
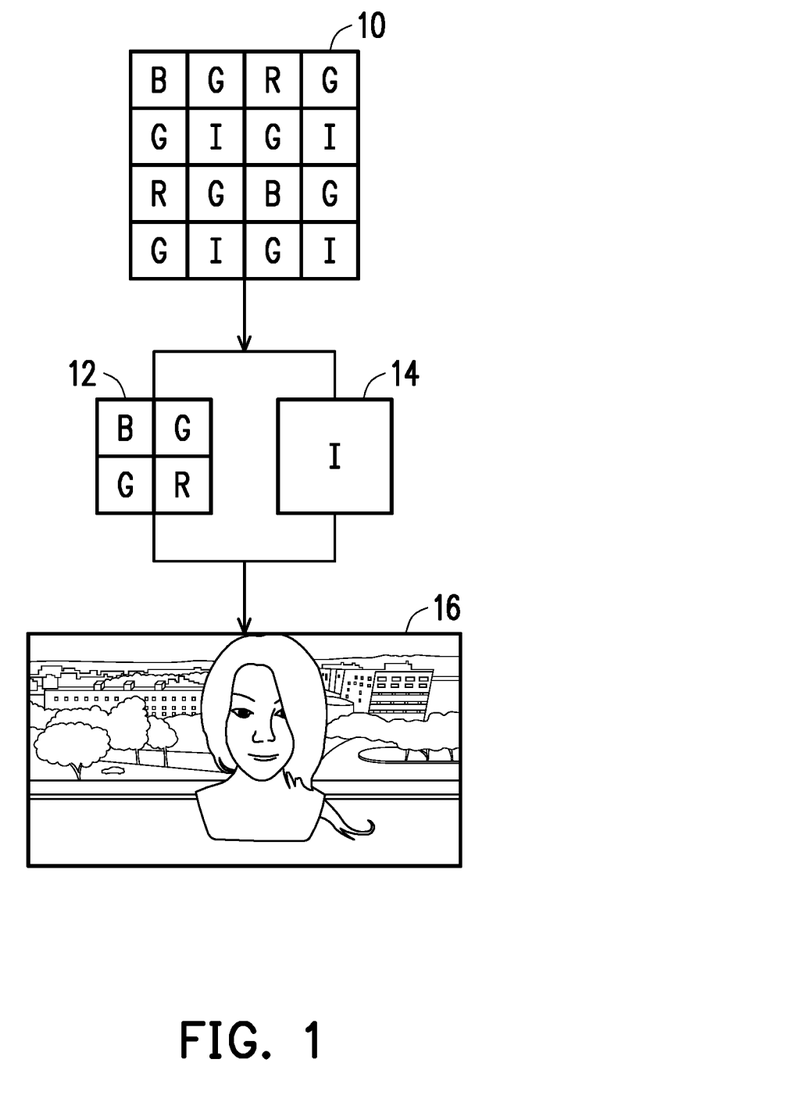
FIG. 1 is a schematic diagram of conventional image capture using an image sensor.

In this regard, the current technology adopts a new image sensor architecture, which utilizes the characteristic of high light sensitivity of the infrared ray (IR) sensor, and interleaves IR pixels among the color pixels of the image sensor to assist in brightness detection. For example, FIG. 1 is a schematic diagram of conventional image capture using an image sensor. Please refer to FIG. 1, in addition to red (R), green (G), blue (B), and other color pixels, a conventional image sensor 10 is also interleaved with infrared (I) pixels. In this way, the image sensor 10 can combine color information 12 captured by the R, G, and B color pixels with brightness information 14 captured by the I pixels to obtain an image 16 with moderate color and brightness.

However, under the architecture of the single image sensor, the exposure conditions of each pixel in the image sensor are the same. Therefore, only the exposure conditions more adapted for color pixels or I pixels can be selected to capture images. It is still impossible to effectively use the characteristics of the two types of pixels to improve the image quality of the captured image.

SUMMARY

The application provides a dual sensor imaging system and a privacy protection imaging method thereof, which may generate a scene image with details of an imaging scene without infringing on privacy of an imaging target.

The dual sensor imaging system of the disclosure includes at least one color sensor, at least one infrared ray (IR) sensor, a storage device, and a processor coupled to the color sensor, the IR sensor, and the storage device. The processor is configured to load and execute a computer program stored in the storage device to: control the color sensor and the IR sensor to respectively capture multiple color images and multiple IR images by adopting multiple exposure conditions adapted for an imaging scene; adaptively select a combination of the color image and the IR image that can reveal details of the imaging scene; detect a feature area with at least one feature of a target of interest in the color image according to the features; and fuse the selected color image and IR image to generate a fusion image with details of the imaging scene, crop an image of the feature area in the fusion image to be replaced with an image not belonging to the IR image, so as to generate a scene image.

The privacy protection imaging method of the dual sensor imaging system of the disclosure is adapted for the dual sensor imaging system including at least one color sensor, at least one infrared ray (IR) sensor, and a processor. The method includes the following steps. The color sensor and the IR sensor are controlled to respectively capture multiple color images and multiple IR images by adopting multiple exposure conditions adapted for an imaging scene. A combination of the color image and the IR image that can reveal details of the imaging scene is adaptively selected. A feature area with at least one feature of a target of interest in the color image is detected according to the features. The selected color image and IR image are fused to generate a fusion image with details of the imaging scene, an image of the feature area in the fusion image is cropped and replaced with an image not belonging to the IR image, so as to generate a scene image.

Based on the above, the dual sensor imaging system and the privacy protection imaging method thereof of the disclosure use independently configured color sensor and IR sensor to capture multiple images by adopting different exposure conditions adapted for the current imaging scene. The combination of the color image and the IR image that can reveal details of the imaging scene is selected for fusion. Then, a sensitive area is replaced with a non-IR image, such as a high dynamic range (HDR) image, so as to generate the scene image with details of the imaging scene without infringing on the privacy of the imaging target.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

The disclosure provides a dual sensor imaging system and a privacy protection imaging method thereof, which use independently configured color sensor and IR sensor respectively to capture multiple images under different exposure conditions and select the color image and the IR image with suitable exposure conditions to be fused into a result image, so as to complement the texture details of the color image and improve the image quality of the imaging image. The IR image captured by the IR sensor may infringe the privacy of a capturing target, such as revealing the details of the body under wearing. The imaging method of the embodiment of the disclosure may process a specific area, thereby avoiding the above infringement while improving the imaging quality.

Figure 2:
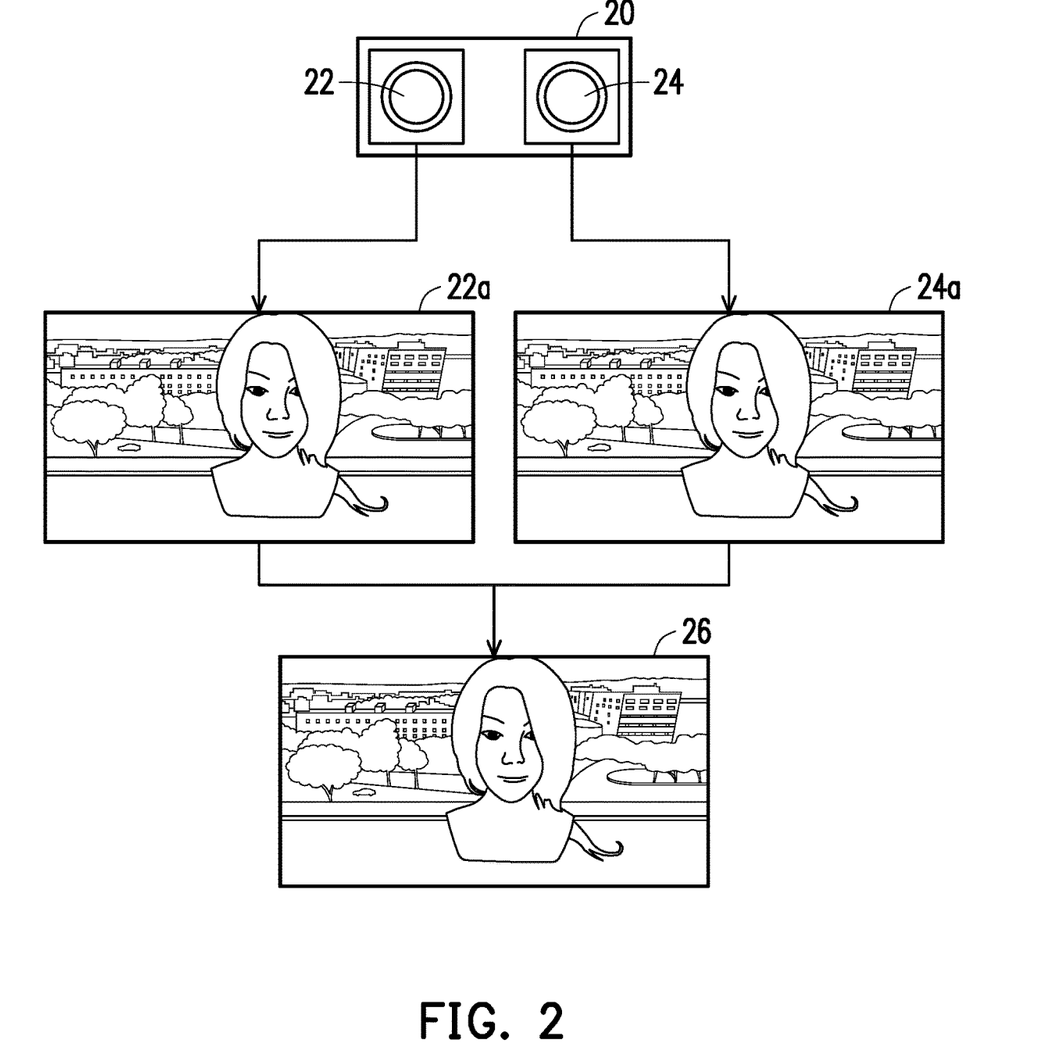
FIG. 2 is a schematic diagram of image capture using an image sensor according to an embodiment of the disclosure.

FIG. 2 is a schematic diagram of image capture using an image sensor according to an embodiment of the disclosure. Referring to FIG. 2, an image sensor 20 of an embodiment of the disclosure adopts a dual sensor architecture of independently configured color sensor 22 and infrared ray (IR) sensor 24. Using the characteristics of each of the color sensor 22 and the IR sensor 24, multiple images are respectively captured by adopting multiple exposure conditions adapted for the current capturing scene, and a color image 22a and an IR image 24a with appropriate exposure conditions are selected. Through image fusion, the IR image 24a is configured to complement the texture details lacking in the color image 22a, so as to obtain a scene image 26 with good color and texture details.

Figure 3:
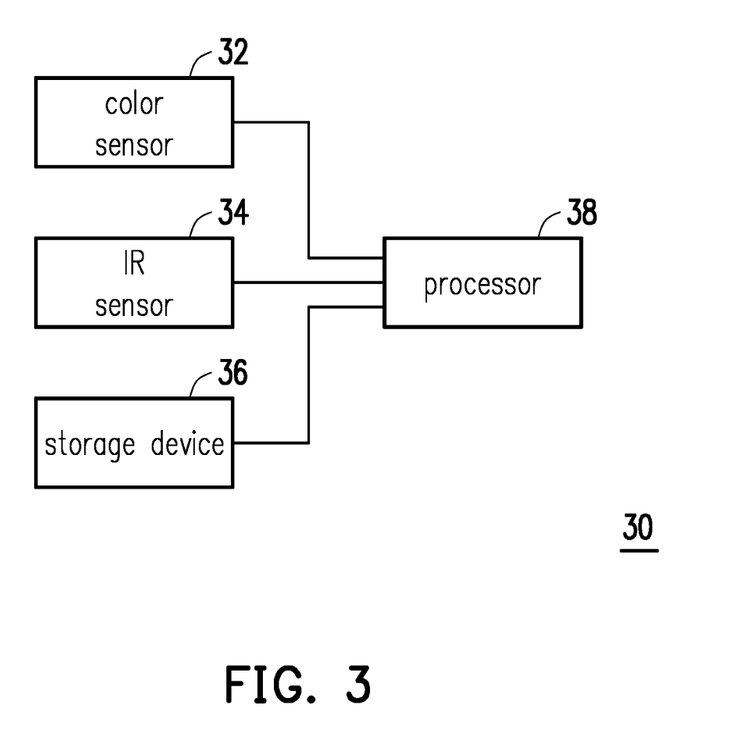
FIG. 3 is a block diagram of a dual sensor imaging system according to an embodiment of the disclosure.

FIG. 3 is a block diagram of a dual sensor imaging system according to an embodiment of the disclosure. Referring to FIG. 3, the dual sensor imaging system 30 of the embodiment may be configured in electronic device such as mobile phones, tablets, laptops, navigation devices, dashcams, digital cameras, digital video cameras, etc., and is configured to provide an imaging function. The dual sensor imaging system 30 includes at least one color sensor 32, at least one IR sensor 34, a storage device 36, and a processor 38, and the functions thereof are as follows.

The color sensor 32, for example, includes a charge coupled device (CCD), a complementary metal-oxide semiconductor (CMOS) element, or other types of photosensitive elements, and may sense light intensity to generate images of the imaging scene. The color sensor 32 is, for example, an RGB image sensor which includes red (R), green (G), and blue (B) color pixels, and is configured to capture color information of red light, green light, blue light, etc. in the imaging scene, and fuse the color information to generate a color image of the imaging scene.

The IR sensor 34, for example, includes a CCD, a CMOS element, or other types of photosensitive elements, and can sense an infrared ray by adjusting the wavelength sensing range of the photosensitive element. The IR sensor 34, for example, uses the above photosensitive elements as pixels to capture infrared information in the imaging scene, and fuse the infrared information to generate an IR image of the imaging scene.

The storage device 36 is, for example, any type of fixed or removable random access memory (RAM), read-only memory (ROM), flash memory, hard disk, similar elements, or a combination of the above elements, and is configured to store a computer program executed by the processor 38. In some embodiments, the storage device 36 may, for example, also store the color image captured by the color sensor 32 and the IR image captured by the IR sensor 34.

The processor 38 is, for example, a central processing unit (CPU), other programmable general-purpose or specific-purpose microprocessors, microcontrollers, digital signal processors (DSPs), programmable controllers, application specific integrated circuits (ASICs), programmable logic devices (PLDs), other similar devices, or a combination of these devices, and the disclosure is not limited thereto. In the embodiment, the processor 38 may load a computer program from the storage device 36 to execute the privacy protection imaging method of the dual sensor imaging system of the embodiment of the disclosure.

Figure 4:
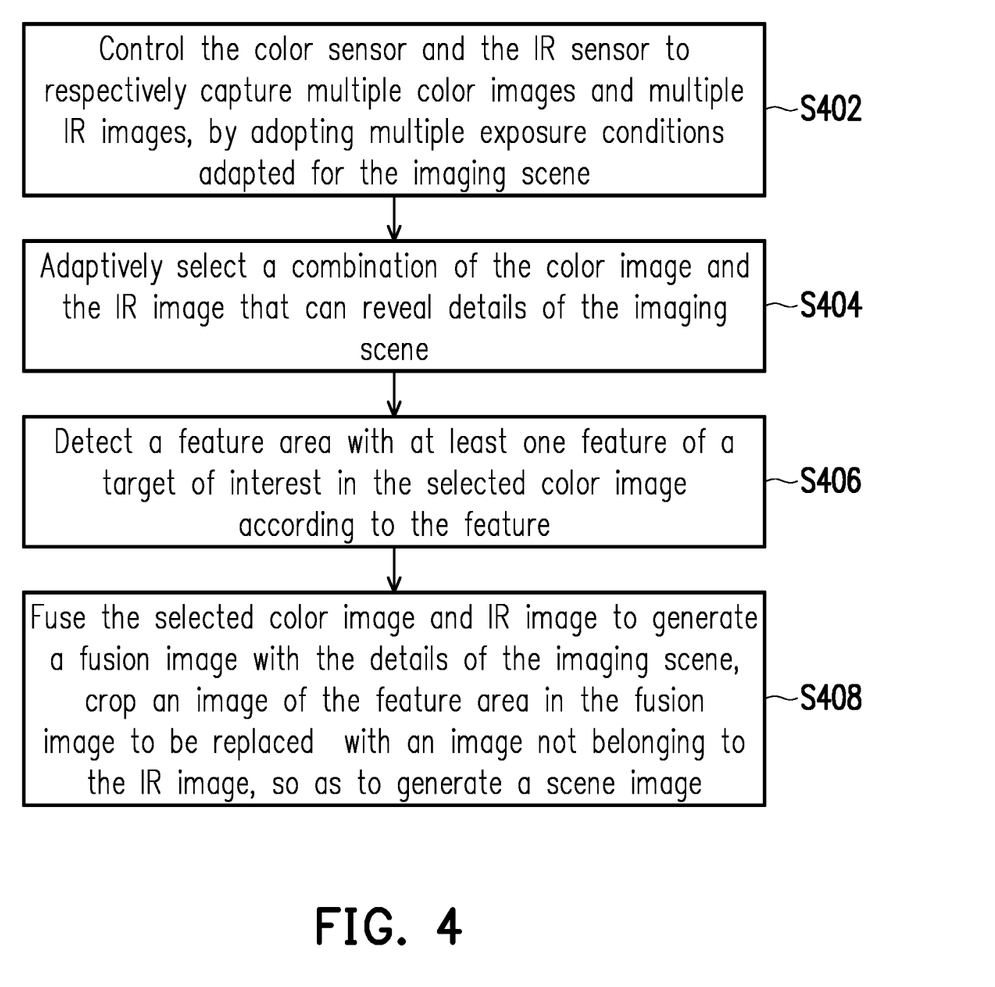
FIG. 4 is a flow chart of a privacy protection imaging method of the dual sensor imaging system according to an embodiment of the disclosure.

FIG. 4 is a flow chart of a privacy protection imaging method of the dual sensor imaging system according to an embodiment of the disclosure. Referring to FIG. 3 and FIG. 4 at the same time, the method of this embodiment is adapted for the dual-sensor imaging system 30, and the detailed steps of the privacy protection imaging method of this embodiment are described below in conjunction with the elements of the dual sensor imaging system 30.

In Step S402, the processor 38 controls the color sensor 32 and the IR sensor 34 to respectively capture multiple color images and multiple IR images by adopting multiple exposure conditions adapted for the current imaging scene.

In some embodiments, the processor 38 controls at least one of the color sensor 32 and the IR sensor 34 to adopt a standard exposure condition to capture at least one standard image of the imaging scene, and use these standard images to identify the imaging scene. The standard exposure condition includes aperture, shutter, photosensitivity, and other parameters determined by the existing metering technology. The processor 38 identifies the imaging scene, including the location of the imaging scene (indoor or outdoor), light source (high light source or low light source), contrast (high contrast or low contrast), type of the imaging subject (object or portrait), state (dynamic or static), etc., according to the strength or distribution of image parameters such as hue, value, chroma, and white balance of the image captured under this exposure condition. In other embodiment, the processor 38 may also adopt positioning to identify the imaging scene or directly receive a user operation to set the imaging scene, and there is no limitation here.

In some embodiments, the processor 38 controls the color sensor 32 and the IR sensor 34 to capture color images with a shorter or longer exposure time based on the exposure time in the standard exposure condition. The difference in the exposure times of these color images is, for example, any value between −3 and 3 exposure value (EV), and there is no limitation here. For example, if an A image is twice as bright as a B image, the EV of the B image may be increased by 1, and so on. The exposure value may have a decimal (for example, +0.3 EV), and there is no limitation here.

In Step S404, the processor 38 adaptively selects a combination of the color image and the IR image that can reveal details of the imaging scene. In some embodiments, the processor 38, for example, controls the color sensor 32 to capture the color image with an appropriate exposure time, so as to preserve partial color details of the imaging scene and ensure that the subsequent fusion image may reveal the color details of the imaging scene. The appropriate exposure time is, for example, an exposure time that is shorter than the exposure time that will cause overexposure of the captured image by a preset time length. The preset time length is, for example, any value from 0.01 to 1 second, and there is no limitation here.

In some embodiments, the processor 38 may, for example, first select one of the color images as a reference image according to the color details of each color image, identify at least one defect area lacking texture details in the reference image, and then select one of the IR images as an image to be fused with the reference image according to the texture details of the images corresponding to these defect areas in each IR image.

In detail, since the color sensor 32 can only adopt a single exposure condition to capture color images at a time, each color image may have areas with high noise, overexposure, or underexposure (that is, the above defect areas) when the imaging scene has low light source or high contrast. At this time, the processor 38 may use the characteristic of high light sensitivity of the IR sensor 34 to select the IR image with the texture details of the defect area from the multiple IR images previously captured for the defect area to be used to complement the texture details of the defect area in the color image.

In Step S406, the processor 38 detects a feature area with at least one feature of a target of interest in the selected color image according to the feature. The feature is, for example, a body feature of human, such as face, torso, limbs, etc., or a feature of human wearing, such as mask, clothes, pants etc., and there is no limitation here.

In some embodiments, the processor 38, for example, uses a machine learning model to identify the target of interest in the color image, so as to detect the feature area. The machine learning model is, for example, trained by using multiple color images including the target of interest and the identification results of the target of interest in each color image.

In detail, the machine learning model is, for example, a convolutional neural network (CNN), a deep neural network (DNN), a recurrent neural network (RNN), or other models with learning functions including an input layer, at least one hidden layer, and an output layer, and there is no limitation here. The processor 38, for example, sequentially inputs multiple color images including the target of interest into the input layer. Multiple neurons in each hidden layer use an activation function to calculate the current output for the output of the input layer. The activation function is, for example, a sigmoid (S) function or a tanh function, and there is no limitation here. Then, the output layer uses a conversion function, such as a normalization index (softmax) function, to convert the current output of the hidden layer into the prediction result of the target of interest. Then, the processor 38 compares the prediction result with the identification result corresponding to the current input color image to update the weight of each neuron of the hidden layer according to the comparison result. The processor 38, for example, uses the prediction result output by the machine learning model and the actual identification result to calculate the loss function to be used to measure whether the prediction result of the machine learning model is accurate enough, so as to update the weight of each neuron of the hidden layer. In other embodiments, the processor 38 may also use the gradient descent (GD) or backpropagation (BP) to update the weight of each neuron of the hidden layer, and there is no limitation here. Finally, the processor 38 repeats the above steps to train the machine learning model to identify the target of interest, and obtain the area occupied by the target of interest in the color image as the feature area.

In Step S408, the processor 38 fuses the selected color image and IR image to generate a fusion image with details of the imaging scene, and crops an image of the feature area in the fusion image to be replaced with an image not belonging to the IR image, so as to generate a scene image. The image not belonging to the IR image is, for example, the above color image or an image generated from multiple color images via a high dynamic range (HDR) process, and there is no limitation here.

In some embodiments, the processor 38, for example, adopts a measure of calculating the average or weighted average of the pixel values of the corresponding pixels in the selected color image and the entire image of the IR image, or adopts other image fusion measures to directly fuse the selected color image and entire IR image. In some embodiment, the processor 38 may also only focus on the defect area in the color image, and use the image corresponding to the defect area in the IR image to fill in or replace the image of the defect area in the color image, and there is no limitation here.

In some embodiments, the processor 38, for example, crops an image of the feature area from the selected color image and IR image before fusion, and then pastes the image not belonging to the IR image to the feature area in the fusion image, so as to generate a scene image. In this way, the amount of calculation required for image fusion may be reduced.

In some embodiments, the processor 38, for example, controls the color sensor 32 to capture multiple color images by adopting multiple exposure times longer or shorter than the exposure time of the selected color image and executes the HDR process, so as to generate an HDR image with details of the feature area, and use the HDR image to replace the feature area in the cropped fusion image.

In detail, the processor 38, for example, uses a shorter exposure time and a longer exposure time according to the exposure time of the selected color image, controls the color sensor 32 to respectively capture color images with the shorter exposure time and the color images with the longer exposure, and implements the HDR process in conjunction with color images captured with the original exposure time. That is, the area with better color and texture details is selected from the three color images to complement areas lacking details in other color images, so as to obtain the HDR image with good details in both bright and dark parts.

In some embodiments, the processor 38 may select the exposure time used to capture multiple color images according to the details of the feature area of the selected color image, so that after the captured multiple color images are HDR processed, the HDR image with details of the feature area may be generated. For example, if the feature area of the selected color image lacks color and texture details due to overexposure, the processor 38 may select multiple shorter exposure times to capture the color image and to execute the HDR process, so as to generate the HDR image with the color and texture details. Similarly, if the feature area of the selected color image lacks color and texture details due to underexposure, the processor 38 may select multiple longer exposure times to capture the color image and to execute the HDR process, so as to generate the HDR image with the color and texture details.

In some embodiments, the processor 38 may, for example, execute a noise reduction (NR) process such as a 2D spatial denoise for the HDR image to reduce the noise in the HDR image and improve the image quality of the finally output image.

By the above method, the dual sensor imaging system 30 may not only generate images including all the details (color and texture details) of the imaging scene, but may also replace the image of feature area in the image with the image not belong to the IR images (such as the HDR image), thereby improving the image quality of the captured image without infringing on the privacy of the imaging target.

Figure 5:
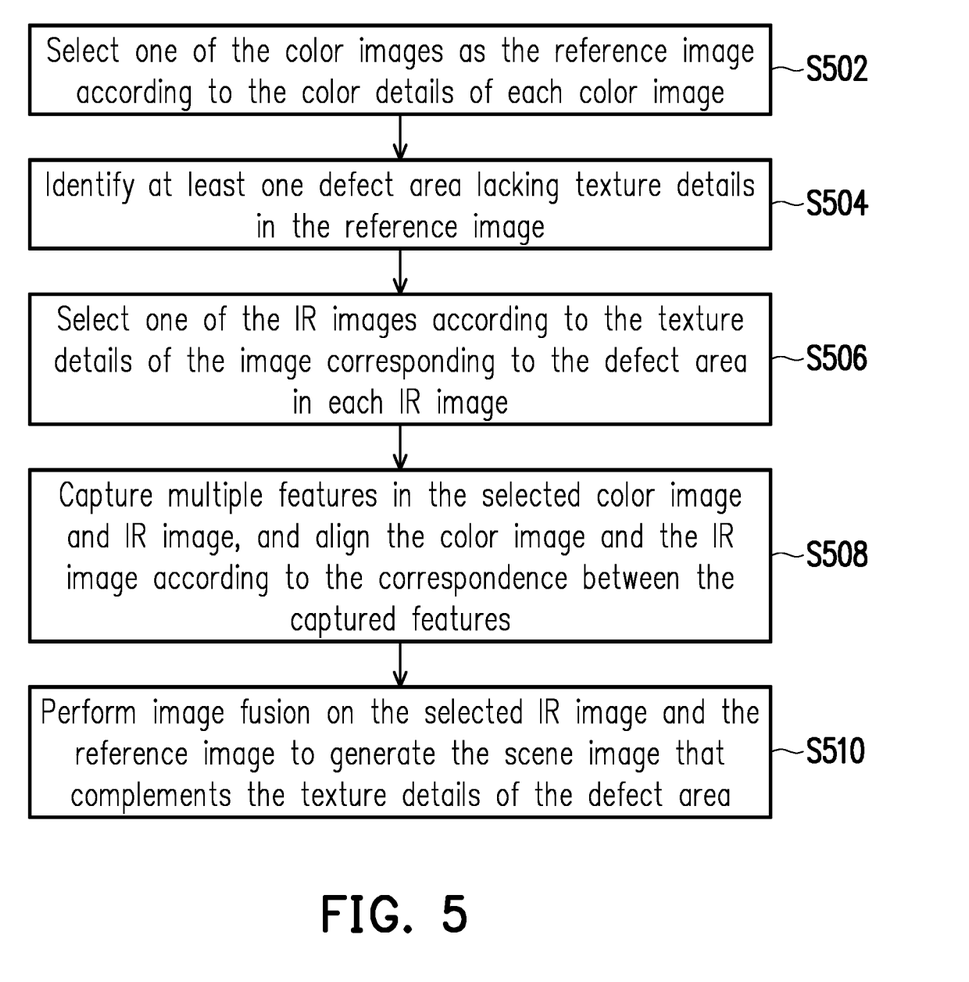
FIG. 5 is a flow chart of a privacy protection imaging method of the dual sensor imaging system according to an embodiment of the disclosure.

FIG. 5 is a flow chart of a privacy protection imaging method of the dual sensor imaging system according to an embodiment of the disclosure. Referring to FIG. 3 and FIG. 5 at the same time, the embodiment further illustrates the detailed implementation of the above embodiment for fusion of the entire image. The method of this embodiment is adapted for the dual sensor imaging system 30, and the detailed steps of the privacy protection imaging method of this embodiment are described below in conjunction with the elements of the dual sensor imaging system 30.

In Step S502, the processor 38 selects one of the color images as the reference image according to the color details of each color image. In an embodiment, the processor 38, for example, selects the color image with the most color details as the reference image. The amount of the color details may be determined, for example, by the size of the overexposed or underexposed areas in the color image. In detail, the color of pixels in the overexposed area approaches white, and the color of pixels in the underexposed area approaches black, so the color details of these areas will be less. Therefore, if the color image includes more such areas, it means that the color details thereof are less. Based on this, the processor 38 may determine which color image has the most color details to be used as the reference image. In other embodiments, the processor 38 may also distinguish the amount of the color details of each color image based on the contrast, saturation, or other image parameters thereof, and there is no limitation here.

In Step S504, the processor 38 identifies at least one defect area lacking texture details in the reference image. The defect area is, for example, the above overexposed area or underexposed area, or an area with higher noise captured under a low light source, and there is no limitation here.

In Step S506, the processor 38 selects one of the IR images according to the texture details of the image corresponding to the defect area in each IR image. In an embodiment, the processor 38, for example, selects the IR image with the most texture details of the image corresponding to the defect area as the image fused with the reference image. The processor 38, for example, distinguishes the amount of texture details according to the contrast or other image parameters of each IR image, and there is no limitation here.

In Step S508, the processor 38 executes feature capture on the selected color image and IR image to capture multiple features in the color image and the IR image, and aligns the color image and the IR image according to the correspondence between the captured features. It should be noted that the above feature capturing and matching measures are only examples. In other embodiment, the processor 38 may also adopt other types of image aligning measures to align the color images and the IR image, and there is no limitation here.

In Step S510, the processor 38 performs image fusion on the aligned IR image and reference image to generate the scene image that complements the texture details of the defect area.

In some embodiments, the processor 38, for example, calculates the average or weighted average of the pixel values of the corresponding pixels in the color image and the entire image of the IR image to perform image fusion on the IR image and the reference image.

In some embodiment, the processor 38, for example, converts the color space of the reference image from the RGB color space to the YUV color space, and replaces the brightness component of the converted reference image with the brightness component of the IR image, and then converts the color space of the replaced reference image back to the RGB color space, so as to generate the scene image. In other embodiments, the processor 38 may also convert the color space of the reference image to YCbCr, CMYK, or other types of color spaces, and then convert back to the original color space after replacing the brightness component, and the embodiment does not limit the conversion measure of the color space.

In detail, since the brightness component of the IR image has a better signal-to-noise ratio (SNR) and includes more texture details of the imaging scene, directly replacing the brightness component of the reference image with the brightness component of the IR image may greatly increase the texture details in the reference image.

By the above method, the dual sensor imaging system 30 may use the IR image to increase the texture details of the color image, especially for areas with insufficient texture details, thereby improving the image quality of the captured image.

Figure 6:
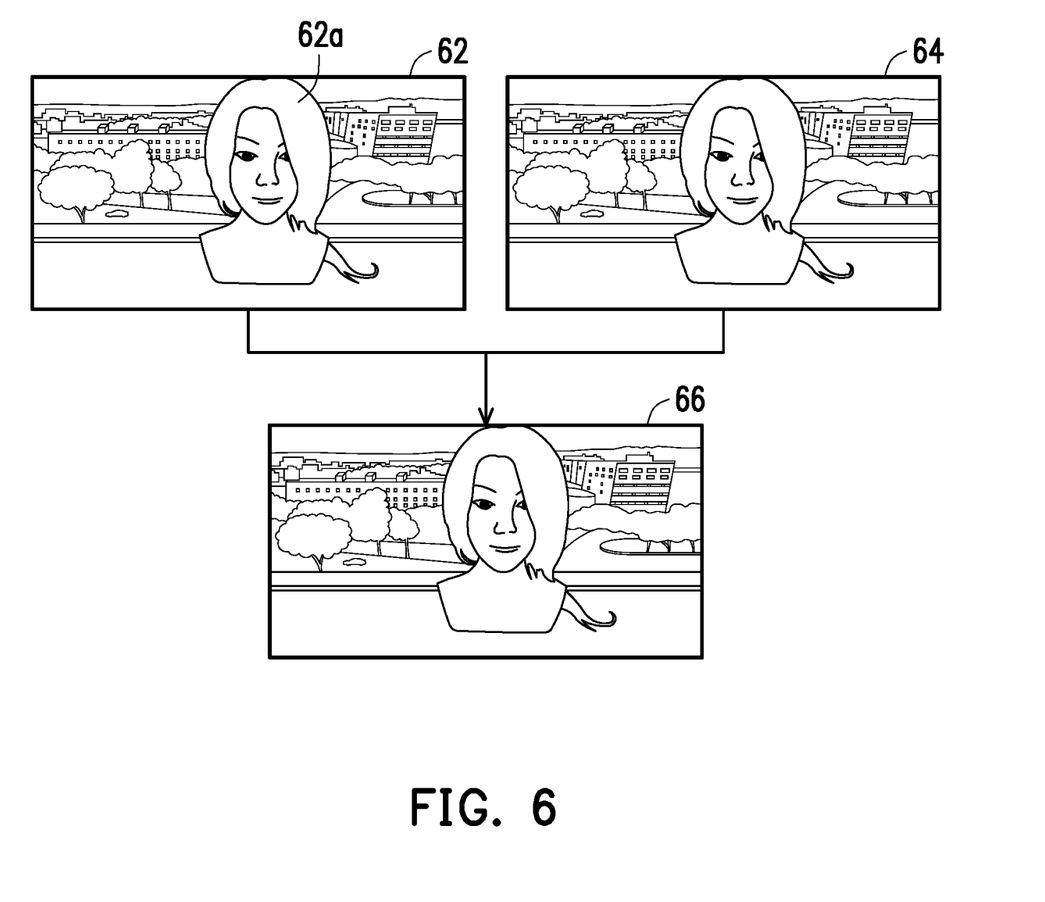
FIG. 6 is an example of a privacy protection imaging method of the dual sensor imaging system according to an embodiment of the disclosure.

For example, FIG. 6 is an example of a privacy protection imaging method of the dual sensor imaging system according to an embodiment of the disclosure. Referring to FIG. 6, a color image 62 with the most color details is selected as the reference image through the privacy protection imaging method of FIG. 5 in the embodiment. For the defect area (such as a face area 62a) lacking texture detail in the color image 62, an IR image 64 with the most texture details of the defect area is selected from the multiple IR images captured by adopting different exposure conditions for image fusion with the color image 62, so as to obtain a scene image 66 with more color details and texture details at the same time.

In some embodiments, the processor 38, for example, converts the color space of the reference image from the RGB color space to the YUV color space, replaces the brightness component of the image of the defect area of the converted reference image with the brightness component corresponding to the defect area of the IR image, and then converts the color space of the replaced reference image back to the RGB color space, so as to generate the scene image. In other embodiments, the processor 38 may also convert the color space of the reference image to YCbCr, CMYK, or other types of color spaces, and then convert back to the original color space after replacing the brightness component, and the embodiment does not limit the conversion measure of the color space.

By the above method, the dual sensor imaging system 30 may use the IR image to fill in areas with insufficient texture details in the color image, thereby improving the image quality of the captured image.

It should be noted that, in some embodiment, the texture details of some defect areas in the color image may not be enhanced or complemented by the IR image due to specific factors. For example, the parallax between the color sensor 32 and the IR sensor 34 may cause the IR sensor 34 to be obscured. In this case, the embodiment of the disclosure provides an alternative measure to increase the texture details of the defect area, so as to maximize the image quality of the captured image.

Figure 7:
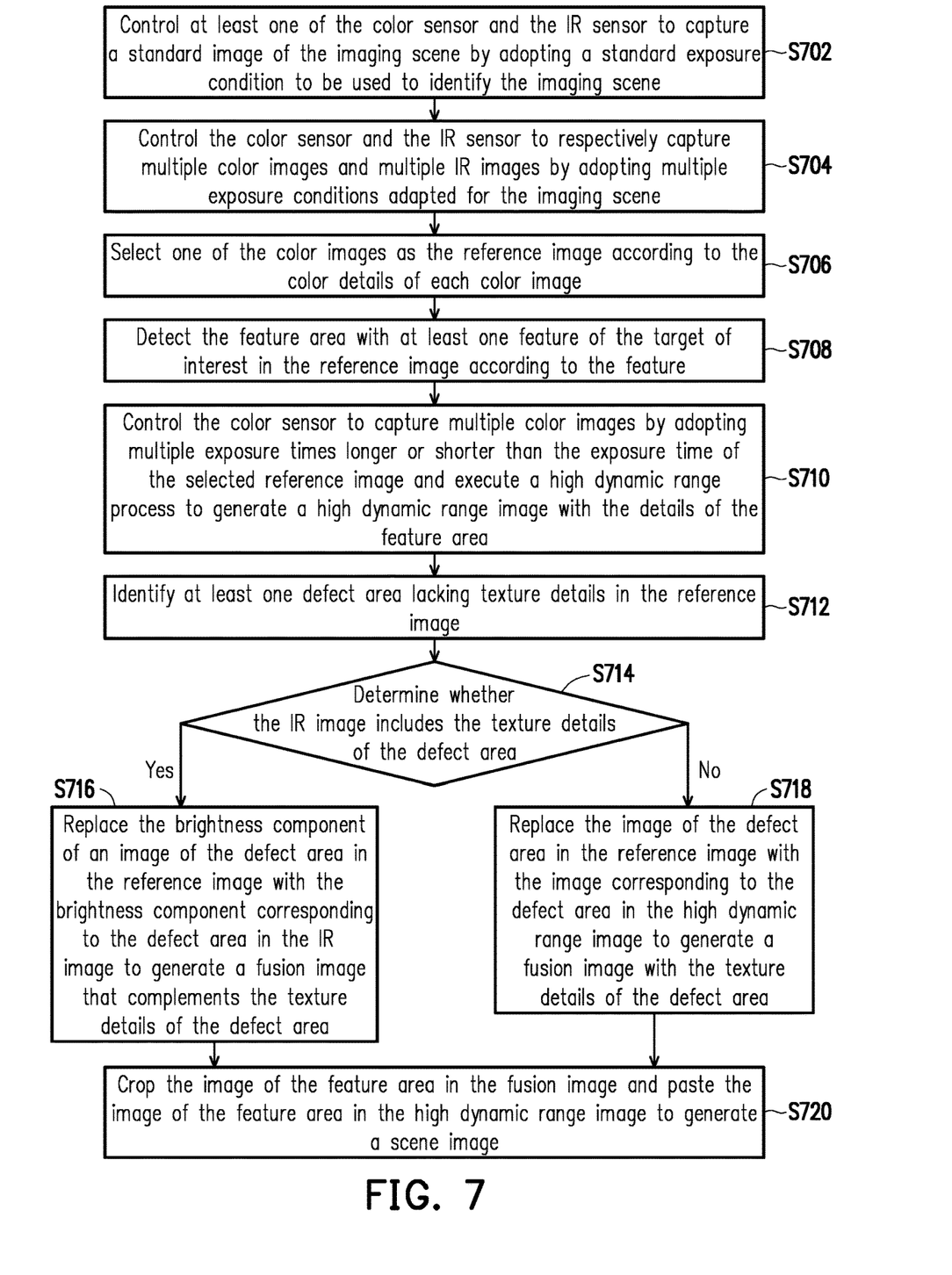
FIG. 7 is a flow chart of a privacy protection imaging method of the dual sensor imaging system according to an embodiment of the disclosure.

FIG. 7 is a flow chart of a privacy protection imaging method of the dual sensor imaging system according to an embodiment of the disclosure. Referring to FIG. 3 and FIG. 7 at the same time, the method of this embodiment is adapted for the dual sensor imaging system 30, and the detailed steps of the privacy protection imaging method of this embodiment are described below in conjunction with the elements of the dual sensor imaging system 30.

In Step S702, the processor 38 controls at least one of the color sensor and the IR sensor to capture at least one standard image of the imaging scene by adopting a standard exposure condition, and identify the imaging scene using the standard images. The definition of the standard exposure condition and the identification measure of the imaging scene are as described in the above embodiment, and will not be repeated here.

In Step S704, the processor 38 controls the color sensor and the IR sensor to respectively capture multiple color images and multiple IR images by adopting multiple exposure conditions adapted for the imaging scene. In Step S706, the processor 38 selects one of the color images as the reference image according to the color details of each color image. In Step S708, the processor 38 detects the feature area with at least one feature of the target of interest in the reference image according to the feature. In Step S710, the processor 38 controls the color sensor 32 to capture multiple color images by adopting multiple exposure times longer or shorter than the exposure time of the selected color image, and executes the HDR process, so as to generate the HDR image with the details of the feature area. In Step S712, the processor 38 identifies at least one defect area lacking texture details in the reference image. The implementation of the above steps is respectively the same or similar to Steps S402 to S408 and S502 to S504 of the above embodiments, so the details will not be repeated here.

Different from the above embodiment, in Step S714, the processor 38 determines whether there is any IR image in the multiple IR images that includes the texture details of the defect area in the reference image. The processor 38 may, for example, check whether there is an image in the area corresponding to the defect area in each IR image to determine whether the IR sensor 34 is obscured, and determine whether the IR image may be used to fill in the texture details of the defect area in the reference image.

If there is an IR image including the texture details of the defect area, in Step S716, the processor 38 may replace the brightness component of the image of the defect area in the reference image with the brightness component in the IR image corresponding to the defect area to generate a fusion image that complements the texture details of the defect area.

If there is no IR image including the texture details of the defect area, in Step S914, the processor 38 may replace the image of the defect area in the reference image with an image corresponding to the defect area in the HDR image to generate a fusion image with texture details of the defect area.

In some embodiments, the processor 38 may combine the processing measures of Steps S716 and S718 to individually select appropriate processing measures for multiple defect areas in the reference image, so as to maximize the details of the reference image, thereby improving the image quality of the captured image.

Finally, in Step S720, the processor 38 crops the image of the feature area in the fusion image and pastes the image of the feature area in the HDR image to generate a scene image.

By the above method, the dual sensor imaging system 30 may not only use the IR image or the HDR image to complement the texture details for the defect areas with insufficient texture details in the color image, but may also further replace the image of the feature area in the fusion image with the HDR image, thereby improving the image quality of the captured image without infringing on the privacy of the imaging target.

In summary, the dual sensor imaging system and the privacy protection imaging method thereof of the disclosure use independently configured color sensor and IR sensor to respectively capture multiple images and select images with appropriate exposure conditions for fusion, so as to use the IR image to fill in or increase the lack of texture details in the color image and replace the feature area in the fusion image that may infringe the privacy of the imaging target with the image not belong to the IR image. Therefore, it is possible to generate the scene image with details of the imaging scene without infringing on the privacy of the imaging target.

What is claimed is:

1. A dual sensor imaging system, comprising:
   at least one color sensor;
   at least one infrared ray (IR) sensor;
   a storage device, storing a computer program; and
   a processer, coupled to the at least one color sensor, the at least one IR sensor, and the storage device, and configured to load and execute the computer program to:
      control the at least one color sensor and the at least one IR sensor to respectively capture a plurality of color images and a plurality of IR images by adopting a plurality of exposure conditions adapted for an imaging scene;
      adaptively select a combination of the color image and the IR image that can reveal details of the imaging scene;
      detect a feature area with at least one feature of a target of interest in the color image according to the at least one feature; and
      fuse the selected color image and IR image to generate a fusion image with the details of the imaging scene, and crop an image of the feature area in the fusion image to be replaced with an image not belonging to the IR image, so as to generate a scene image;
   wherein the processor:
   selects one of the color images as a reference image according to color details of the color image;
   identifies at least one defect area lacking texture details in the reference image; and
   selects one of the IR images as the IR image for fusion with the reference image according to texture details of an image corresponding to the at least one defect area in each of the IR images.

2. The dual sensor imaging system according to claim 1, wherein the processor further:
   controls the at least one color sensor to capture a plurality of color images by adopting a plurality of exposure times longer or shorter than an exposure time of the selected color image, and executes a high dynamic range (HDR) process to generate an HDR image with details of the feature area to be used to replace an image of the feature area in the cropped fusion image.

3. The dual sensor imaging system according to claim 2, wherein the processor:
   selects the exposure time for capturing the color images according to the details of the feature area of the color image, so that the HDR image with the details of the feature region is generated after the captured color images are processed by the HDR process.

4. The dual sensor imaging system according to claim 1, wherein the processor:
   controls at least one of the at least one color sensor and the at least one IR sensor to capture at least one standard image of the imaging scene by adopting a standard exposure condition, and identifies the imaging scene using the at least one standard image.

5. The dual sensor imaging system according to claim 1, wherein the processor:

selects the color image with the most color details as the reference; and selects the IR image with the most texture details of the image corresponding to the at least one defect area as the IR image for fusion with the reference image.

6. The dual sensor imaging system according to claim 1, wherein the processor:

replaces a brightness component of an image of the at least one defect area in the reference image with the image corresponding to the at least one defect area in the IR image to generate the scene image that complements the texture details of the at least one defect area.

7. The dual sensor imaging system according to claim 1, wherein the processor further:

determines whether each of the IR images comprises the texture details of the at least one defect area; and replaces an image of the at least one defect area in the reference image with an image corresponding to the at least one defect area in the HDR image when none of the IR images comprises the texture details to generate the scene image with the texture details of the at least one defect area.

8. The dual sensor imaging system according to claim 1, wherein the processor further:

uses a machine learning model to identify the target of interest in the color image, so as to detect the feature area, wherein the machine learning model is trained by using a plurality of color images comprising the target of interest and an identification result of the target of interest in each of the color images.

9. The dual sensor imaging system according to claim 8, wherein the machine learning model comprises an input layer, at least one hidden layer, and an output layer, and the processor:

sequentially inputs the color images to the input layer, wherein a plurality of neurons in each of the at least one hidden layer uses an activation function to calculate a current output for an output of the input layer, and the output layer converts the output of the hidden layer into a prediction result of the target of interest; and compares the prediction result with the identification result corresponding to the currently input color image to update a weight of each of the neurons of the hidden layer according to a comparison result; and repeats the above steps to train the machine learning model to identify the target of interest.

10. A privacy protection imaging method of a dual sensor imaging system, wherein the dual sensor imaging system comprises at least one color sensor, at least one IR sensor, and a processor, the privacy protection imaging method comprising:

controlling the at least one color sensor and the at least one IR sensor to respectively capture a plurality of color images and a plurality of IR images by adopting a plurality of exposure conditions adapted for an imaging scene;

adaptively selecting a combination of the color image and the IR image that can reveal details of the imaging scene;

detecting a feature area with at least one feature of a target of interest in the selected color image according to the at least one feature; and fusing the selected color image and IR image to generate a fusion image with the details of the imaging scene, and cropping an image of the feature area in the fusion image to be replaced with an image not belonging to the IR image, so as to generate a scene image;

wherein the step of adaptively selecting the combination of the color image and the IR image that can reveal the details of the imaging scene comprises:

selecting one of the color images as a reference image according to color details of the color image;

identifying at least one defect area lacking texture details in the reference image; and selecting one of the IR images as the IR image for fusion with the reference image according to texture details of an image corresponding to the at least one defect area in each of the IR images.

11. The privacy protection imaging method according to claim 10, further comprising:

controlling the at least one color sensor to capture a plurality of color images by adopting a plurality of exposure times longer or shorter than an exposure time of the selected color image, and executing an HDR process to generate an HDR image with details of the feature area, and using the HDR image to replace the image of the feature area in the cropped fusion image.

12. The privacy protection imaging method according to claim 10, wherein the step of identifying the imaging scene of the dual sensor imaging system comprises:

controlling at least one of the at least one color sensor and the at least one IR sensor to capture at least one standard image of the imaging scene by adopting a standard exposure condition, and identifying the imaging scene using the at least one standard image.

13. The privacy protection imaging method according to claim 10, wherein the step of adaptively selecting the combination of the color image and the IR image that can reveal the details of the imaging scene comprises:

selecting the color image with the most color details as the reference image; and selecting the IR image with the most texture details of the image corresponding to the at least one defect area as the IR image for fusion with the reference image.

14. The privacy protection imaging method according to claim 10, wherein the step of fusing the selected color image and IR image to generate the fusion image with the details of the imaging scene comprises:

replacing a brightness component of an image of the at least one defect area in the reference image with the image corresponding to the at least one defect area in the IR image to generate the scene image that complements the texture details of the at least one defect area.

15. The privacy protection imaging method according to claim 10, wherein before the step of fusing the selected color image and IR image to generate the fusion image with the details of the imaging scene, the privacy protection imaging method further comprises:

determining whether each of the IR images comprises the texture details of the at least one defect area; and replacing an image of the at least one defect area in the reference image with an image corresponding to the at least one defect area in the HDR image when none of the IR images comprises the texture details to generate the scene image with the texture details of the at least one defect area.

16. The privacy protection imaging method according to claim 10, wherein the step of detecting the feature area with the at least one feature of the target of interest in the selected color image according to the at least one feature comprises:

using a machine learning model to identify the target of interest in the color image, so as to detect the feature area, wherein the machine learning model is trained by using a plurality of color images comprising the target of interest and an identification result of the target of interest in each of the color images.

17. The privacy protection imaging method according to claim 16, wherein the machine learning model comprises an input layer, at least one hidden layer, and an output layer, and before the step of detecting the feature area with the at least one feature of the target of interest in the selected color image according to the at least one feature further comprises:
- sequentially inputting the color image to the input layer, wherein a plurality of neurons in each of the at least one hidden layer uses an activation function to calculate a current output for an output of the input layer, and the output layer converts the output of the hidden layer into a prediction result of the target of interest; and
- comparing the prediction result with the identification result corresponding to the currently input color image to update a weight of each of the neurons of the hidden layer according to a comparison result; and
- repeating the above steps to train the machine learning model to identify the target of interest.

18. The privacy protection imaging method according to claim 10, wherein the step of controlling the at least one color sensor to capture the color images by adopting the exposure times longer or shorter than the exposure time of the selected color image, and executing the HDR process to generate the HDR image with the details of the feature area comprises:
- selecting the exposure time for capturing the color images according to the details of the feature area of the color image, so that the HDR image with the details of the feature area is generated after the captured color images are processed by the HDR process.

* * * * *